(12) United States Patent
Kang et al.

(10) Patent No.: US 7,600,613 B2
(45) Date of Patent: Oct. 13, 2009

(54) RFID AND LOW RESOLUTION CCD SENSOR BASED POSITIONING SYSTEM

(75) Inventors: Pengju Kang, Hartford, CT (US); Jae-Hyuk Oh, Tolland, CT (US); Alan M. Finn, Hebron, CT (US); Pei-Yuan Peng, Ellington, CT (US); Norbert A. M. Hootsmans, S. Glastonbury, CT (US)

(73) Assignee: Otis Elevator Company, Farmington, CT (US)

( * ) Notice: Subject to any disclaimer, the term of this patent is extended or adjusted under 35 U.S.C. 154(b) by 617 days.

(21) Appl. No.: 10/576,836

(22) PCT Filed: Oct. 31, 2003

(86) PCT No.: PCT/US03/34600

§ 371 (c)(1), (2), (4) Date: Apr. 18, 2006

(87) PCT Pub. No.: WO2005/052842

PCT Pub. Date: Jun. 9, 2005

(65) Prior Publication Data

US 2007/0084675 A1 Apr. 19, 2007

(51) Int. Cl.
 *B66B 1/36* (2006.01)
 *B66B 3/02* (2006.01)
(52) U.S. Cl. ................ 187/391; 187/283; 187/394
(58) Field of Classification Search ........... 187/391, 187/393, 394, 282, 283
 See application file for complete search history.

(56) References Cited

U.S. PATENT DOCUMENTS 5,306,882 A * 4/1994 Gerwing et al. ............ 187/394
5,682,024 A * 10/1997 Koopman et al. ........... 187/394
5,736,695 A * 4/1998 Hoepken .................... 187/394
5,783,784 A 7/1998 Durand
5,821,477 A 10/1998 Gerstenkorn
5,883,345 A * 3/1999 Schonauer et al. ......... 187/394
6,116,381 A * 9/2000 Jalbert ....................... 187/395
6,305,503 B1 10/2001 Suzuki et al.

(Continued)

FOREIGN PATENT DOCUMENTS

JP 02295866 A * 12/1990

(Continued)

OTHER PUBLICATIONS

International Search Report dated Feb. 17, 2006.

(Continued)

*Primary Examiner*—Walter Benson
*Assistant Examiner*—Eduardo Colon-Santana
(74) *Attorney, Agent, or Firm*—Bachman & LaPointe, P.C.

(57) ABSTRACT

An apparatus and method for measuring a position of a moveable platform comprising a plurality of RFID tags encoded with location information situated at known locations and a plurality of visual markers situated at precise, known locations. An RF reader attached to a moveable platform reads the RFID tags to determine the approximate location of the platform. A camera apparatus attached to the moveable platform scans the visual marker. The scanned image is processed to provide the precise position information of the platform.

18 Claims, 2 Drawing Sheets

U.S. PATENT DOCUMENTS

| | | |
|---|---|---|
| 6,435,315 B1 | 8/2002 | Zaharia |
| 6,554,107 B2 * | 4/2003 | Yumura et al. ............... 187/247 |
| 6,612,403 B2 * | 9/2003 | Silberhorn et al. .......... 187/394 |
| 6,732,839 B2 * | 5/2004 | Schuster ...................... 187/391 |
| 7,077,244 B2 * | 7/2006 | Oh et al. ...................... 187/394 |
| 7,204,347 B2 * | 4/2007 | Schonauer et al. .......... 187/394 |
| 7,264,090 B2 * | 9/2007 | Vecchiotti et al. ........... 187/391 |
| 7,350,625 B2 * | 4/2008 | Deplazes et al. ............ 187/393 |
| 7,441,631 B2 * | 10/2008 | Oh et al. ...................... 187/394 |
| 2005/0039987 A1 * | 2/2005 | Redden ....................... 187/394 |
| 2006/0232789 A1 * | 10/2006 | Oh et al. ...................... 356/614 |
| 2006/0283670 A1 * | 12/2006 | Oh et al. ...................... 187/394 |
| 2007/0095617 A1 * | 5/2007 | Finn ............................ 187/393 |
| 2008/0193138 A1 * | 8/2008 | Oh et al. ..................... 398/128 |

FOREIGN PATENT DOCUMENTS

| | | |
|---|---|---|
| JP | 8225269 A | 9/1996 |
| JP | 9110322 A | 4/1997 |
| JP | 11314868 A | 11/1999 |
| JP | 2002226149 A | 8/2002 |

OTHER PUBLICATIONS

Japanese Office Action dated May 12, 2009.

* cited by examiner

RFID AND LOW RESOLUTION CCD SENSOR BASED POSITIONING SYSTEM

BACKGROUND OF THE INVENTION (1) Field of the Invention

The present invention relates to a system and a method for low-cost and high-performance absolute position referencing for elevators and other conveyances. More specifically, the present invention relates to a system incorporating both RFID sensing technology and CCD image processing to accurately assess the position of a moveable platform.

(2) Description of Related Art

A Positioning Reference System (PRS) is a component of an elevator control system that provides fast and accurate position measurement of a moveable platform, in particular an elevator car, in a hoistway. Traditional optical elevator position reference systems (PRS) exhibit a number of attributes that render them less than operationally optimal.

One method of employing a PRS comprises using a coded tape defined by two tracks of openings cut along the length of the tape. The coded tape spans the entire longitudinal length of a hoistway. An optical sensor, mounted on the elevator car, consisting of a light transmitter and a receiver reads the binary coded information from the coded tape, and relate the readings to the actual position of the elevator car in the hoistway.

A disadvantage of this system is that longitudinal expansions of the hoistway as well as the coded tape can cause positioning errors. Another disadvantage of this system is the high installation costs involved in the installing the tape in the hoistway.

An alternative method involves the use of reflectors mounted on the wall of a hoistway having two tracks of coded symbols printed on reflectors for elevator car positioning. The symbols are detected and evaluated by a two-channel evaluating subsystem, which has optical transmitters for illuminating the tracks and charge-coupled device (CCD) sensors for detecting the reflected images. Pattern recognition logic for each channel recognizes patterns in the images and generates elevator car position information.

A disadvantage of this system is that it requires the use of two CCD cameras for generating elevator car position: one for reading the floor coarse position information and other one for fine positioning information. If redundant systems have to provide data for the normal terminal stopping device (NTSD) and the emergency terminal stopping device (ETSD), the resultant system configuration would cause the production cost to be quite high. Since the system is intended to provide linear position feedback along the hoistway, the coding of the white and dark patterns on the reflector has to be very fine. Very fine coding patterns make the system susceptible to dirt and dust contaminations that may blur the coding patterns causing inaccurate car position information. Another disadvantage is the great effort required for installing the reflector along the path in the elevator hoistway.

What is therefore needed is a high-accuracy positioning means with low cost for installation, and maintenance.

SUMMARY OF THE INVENTION

Accordingly, it is an object of the present invention to provide a system and a method for low-cost and high-performance absolute position referencing for elevators and other conveyances. More specifically, the present invention relates to a system incorporating both RF ID sensing technology and CCD image processing to accurately assess the position of a moveable platform.

In accordance with the present invention, a positioning system for a moveable platform comprises an RF reader for receiving coded data from at least one RF tag positioned at a known location, at least one optical device for capturing an image of a visual cue positioned at a known location, means for decoding the encoded data, means for processing the captured image to determine the position of the visual cue, and means for combining the decoded data and the detected visual cue to calculate a position of the moveable platform.

In further accordance with the present invention, a method for determining position comprises the steps of providing a plurality of RF tags at fixed positions, providing a plurality of visual markers at fixed positions, affixing an RF reader to a moveable platform, affixing an optical device to the moveable platform, using the RF reader to receive coded information from one of the plurality of RF tags, imaging at least one of the plurality of visual markers with the optical device to produce an image, performing image processing on the image to identify a position of a visual cue in the image, combining the position of the visual cue with the coded information to determine a location of the moveable platform.

DETAILED DESCRIPTION OF THE PREFERRED EMBODIMENT(S)

This invention centers on a positioning concept incorporating both RF technology and visual image processing to precisely locate the position of an elevator car. In a preferred embodiment, a number of RF tags encoded with location information are situated at known locations on and around the doorways lining an elevator hoistway. As the elevator comes into proximity with the RF tags, the encoded information is read by an RF reader attached to the elevator so as to determine the floor location of the elevator. Having determined the floor location of the elevator, a visual marker, preferably a horizontal line affixed to the hoistway doorframe at a precisely known position, is visually scanned. The scanned information is image processed to provide the precise position information of the elevator.

Figure 1:
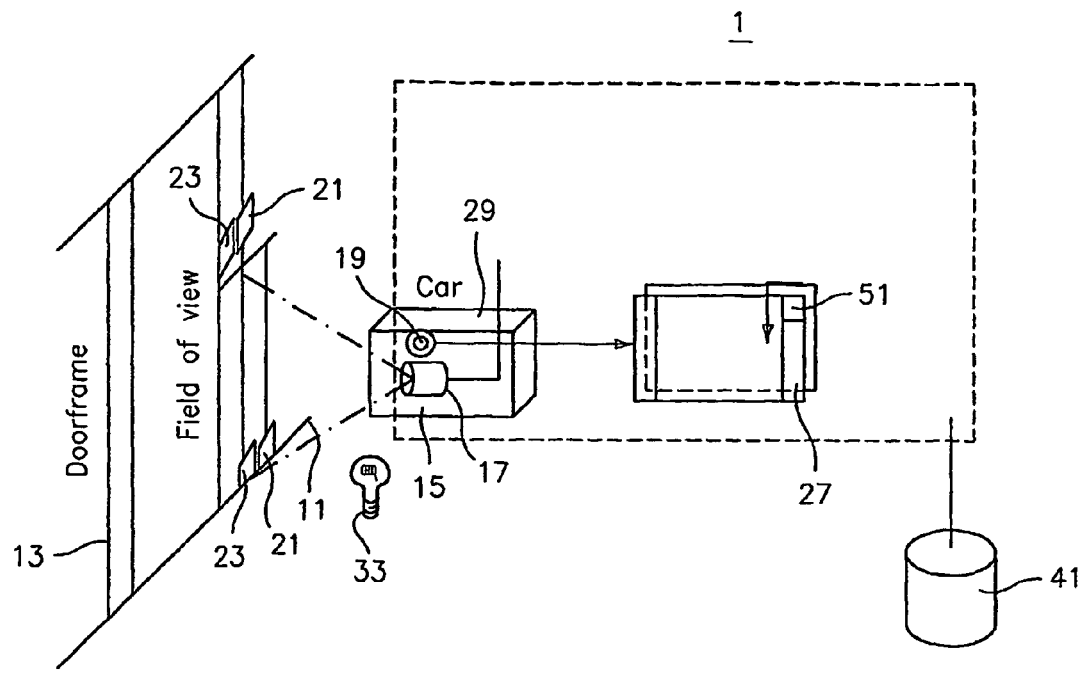
FIG. 1 Schematic illustration of the RFID/CCD elevator positioning system of the present invention.

The major components of the PRS 1 of the present invention are shown with reference to FIG. 1. A number of radio frequency (RF) tags 21, coded to represent floor information and car status information, are attached on the doorframes 13 of a hoistway. Attached in proximity to, preferably to the side of, the RF tags 21 are a number of visual markers, either white or colored, spaced apart on the doorframe 13. In operation, an RF reader 19 mounted on the elevator car 29 reads the RF tags 21 in a direction of movement of the elevator car along the path of travel. The approximate position of a car 29 approaching a certain floor is detected by the RF reader 19. The approximate position and direction of motion gives status information such as car entering into a floor, car entering the landing zone, or car leaving the floor. Based on the car status data, fine position is provided by an optical device 17, preferably a CCD detector, installed on the elevator car 29. The car position is calculated using the displacement of the image of the visual mark 23 on the imaging plane of the optical device 17.

The RF tags 21 are passive transponders that do not require power supply. When the RF reader 19 passes over an RF tag 21, the RF tag 21 is charged remotely by the RF reader 19. As soon as the RF tag 21 is charged, the identity of the RF tag 21 is sent over to the RF reader 19. After the data of car status and floor number are passed over to the RF reader 19, a microprocessor 27 combines the data along with the visual reflector 23 position information acquired by the optical device as described more fully below.

Figure 2:
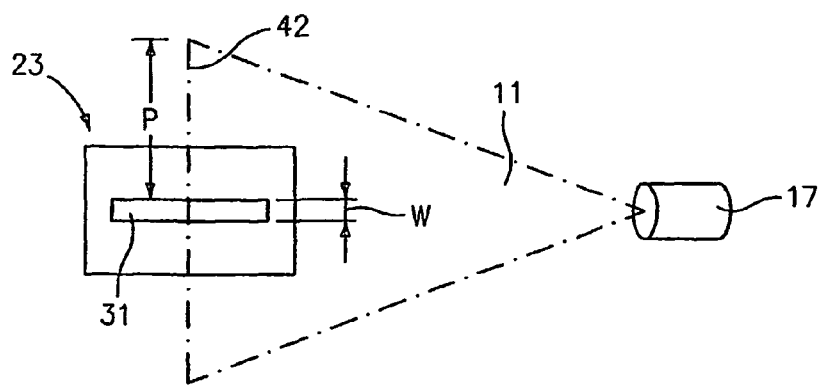
FIG. 2 A detailed depiction of the optical device and visual marker of the present invention.

With reference to FIG. 2 there is illustrated in greater detail the interaction of the optical device 17 and the visual marker 23. Visual marker 23 is of any configuration incorporating a visual cue 31 the exact position of which may be determined and which can be captured as an image by optical device 17. In a preferred embodiment, visual cue 31 is a horizontal line whose position has been precisely determined. Visual marker 23 is preferably placed such that it falls within the field of view 11 of optical device 17 when one or more RF tags 23 indicative of a particular floor are within range to be read by RF reader 19. In practice, visual cue 31 may be any visual indicia possessing a feature or features which can be precisely imaged. In the embodiment shown, visual cue 31 comprises a horizontal line having two edges separated by a width w. The image of visual marker 23 containing visual cue 31 captured by optical device may be one or two dimensional. In the instance where the visual cue 31 is susceptible to a one dimensional scan, optical device 17 may be chosen to produce a one dimensional image formed by visually scanning visual marker 31 along scan axis 42. In another embodiment, optical device 17 may be chosen to produce a two dimensional image formed by visually scanning visual marker 31 across a two dimensional plane.

Figure 3A:
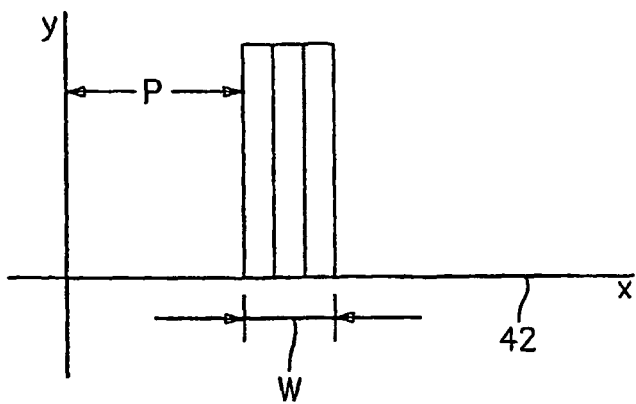
FIG. 3a A graph of the pixel values of an idealized one dimensional image of the present invention.

In the instance of a one dimensional image, the image formed of visual cue 31 is a one dimensional array comprised of picture elements, or pixels, having a value related to the intensity of reflected light recorded by optical device 17. With reference to FIG. 3a, there is illustrated a graph of the theoretical pixel values which would be recorded by an optical device 17 after imaging a visual cue 31 such as that of FIG. 2 wherein the x-axis corresponds to scan axis 42. As one proceeds along scan axis 42, the intensity of each pixel, as measured on the y-axis is ideally zero until one reaches the edge of visual cue 31. After reaching the first edge, the intensity of the pixels increases to a finite value and remains of generally steady intensity until dropping back abruptly to zero. In the present example, the width w of visual cue 31 is exactly three pixels. In addition, the first edge of visual cue 31 is located a distance p from the top of scan axis 42. In this idealized example, distance p is an integer multiple of the width of a single pixel.

Once distance p has been precisely deduced from the image, it is possible to compute the precise location of the elevator car. The lateral distance between the optical device 17 and the doorframe 13 upon which the visual marker 23 is mounted is generally constant as the elevator car 29 moves along the hoistway. Therefore, it is possible to calibrate the optical device 17 so as to map each pixel location in an image captured by the optical device 17 to a physical location on a plane located a distance essentially identical to the distance between the optical device 17 and the doorframe 13.

At installation, the precise position of each visual marker 23 is recorded and stored in memory device 41. Memory device 41 may be of any media type capable of storing and retrieving digital data.

Figure 3B:
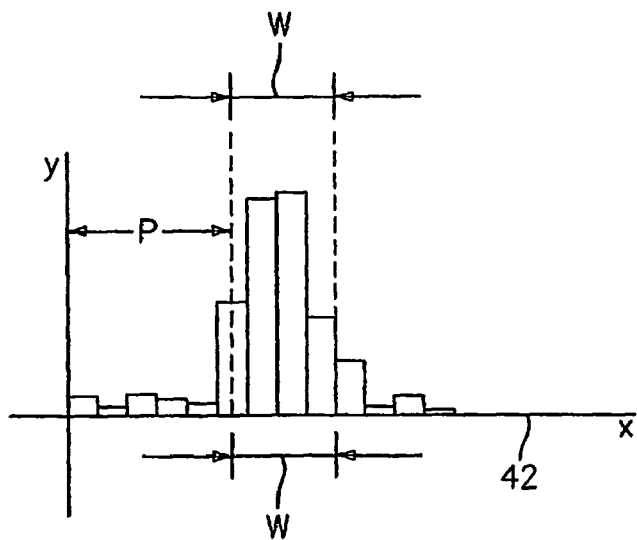
FIG. 3b A graph of the pixel values of a typical one dimensional image of the present invention.

FIG. 3a describes a theoretically perfect instance of an image of visual cue 31. In such an example, the edge of visual cue 31 falls precisely at an integer multiple of pixels from the edge of scan axis 42. In such an instance, it is possible to exactly determine the distance p and, hence, the location of visual cue 31. In practice, however, a graph of the pixel values comprising a one dimensional image resembles more closely that illustrated in FIG. 3b. Note that there is no clearly defined beginning of the edge of visual cue 31. Rather, pixels on either side width w, are near to, but not precisely, zero, and the pixels between width w exhibit attenuated Gaussian characteristics.

In such an instance, it is still possible to determine the position of the first edge, and hence, distance p. There exist numerous convolutions, as well as linear and non-linear imaging techniques known in the art for detecting edges in images. One advantage of such techniques, collectively known as sub-pixel resolution algorithms, is the ability to detect edges and other features with sub-pixel resolution. For example, if a single pixel in the image corresponds to 0.01 inches on the visual marker 23, sub-pixel image processing can deduce the location of an edge to 0.001 inches. The ability to perform sub-pixel processing allows for the use of relatively crude imaging apparatus from which precise location information can be deduced.

Figure 4:
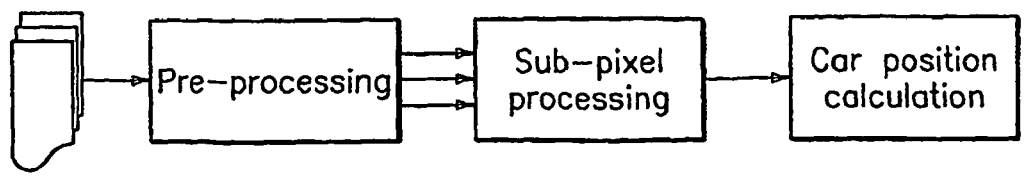
FIG. 4 A block diagram of the steps performed during the image processing of the present invention.

The steps for decoding the images coming from the optical device, preferably a CCD sensor, is accomplished through a signal-processing unit 51 explained in FIG. 4. Signal processing unit 51 preferably runs on microprocessor 27 and may take the form of dedicated hardware or may be implemented as software running on microprocessor 27. The captured visual marker 23 image is processed using a sub-pixel resolution algorithm that has been built into the microprocessor. The car position is determined using the pixel intensity distribution of the visual marker 23 within the field of view 11 of the optical device. The center, or other defined feature, of the visual marker 23 is calculated and compared with the center of the image acquired by the optical device. The difference between the two locations gives the relative position of the car at a floor level. As noted, the sub-pixel image processing algorithm allows the use of cheap low-resolution CCD sensors for car positioning. The sub-pixel algorithm may make use a mathematical model of the expected image characteristics of the visual marker 31, computed and stored in memory device 41, to enhance the physical resolution of a CCD sensor, e.g. from 1×256 pixels to 1×2048 pixels with required accuracy of a PRS. Alternatively, the sub-pixel processing may utilize convolutions, as well as linear and non-linear imaging techniques known in the art for detecting edges in images to similarly enhance the physical resolution of a CCD sensor.

The illumination of the visual marker 23 can be improved using an array of light beams located near the visual marker 23. The illumination source 33 may be mounted on the fixed structure, e.g., doorframe, or on the moving structure, e.g., elevator cab. In this way the images captured by the optical device 23 will have consistent quality along the path of movement. An infrared or ultraviolet light can also be used as the light source to illuminate the visual marker 23. A far infrared or ultraviolet light source 33 gives better penetration capability in case of smoke.

It is an advantage of the present invention that the cost of the PRS is considerably reduced, since the all the visual markers 23 installed along the hoistway can be of a single color and, if desired, a single pattern. The visual markers 23 can be illuminated with an infrared or ultraviolet light, which a visible light source does not interfere with, provided that an infrared or ultraviolet sensitive CCD sensor is used in the PRS.

In a preferred embodiment, the PRS is calibrated by determining the precise location of each visual marker 23 and each location is stored in memory device 41. The contents of memory device 41 are accessible to the microprocessor 27. As a result, even in the event of a power outage or system reset, the present invention can identify its position. Specifically, the RF reader 19 receives the coded information from a nearby RF tag 21 and passes the information to microprocessor 27. Based upon the coded information, microprocessor can retrieve from memory device 41 course position information. Subsequently, optical device 15 images the visual marker 23 and visual cue 31 to produce a one or two dimensional image. The image is forwarded to microprocessor 27 where image processing is performed, preferably sub-pixel processing, to accurately determine the location of visual marker 31 and to compute the precise location of the elevator car 29.

It should be clear to one of ordinary skill in the art that other methods and devices for radio frequency identification (RFID), such as passive tags that resonate at unique frequencies or passively modulate the transmitted signal, are within the scope of this invention. Similarly, illumination sources 33, reflectors, and cameras that operate outside the visible light part of the electromagnetic spectrum are similarly envisioned.

It is apparent that there has been provided in accordance with the present invention a system incorporating both RF ID sensing technology and CCD image processing to accurately assess the position of a moveable platform which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A positioning system for a moveable platform comprising:
    an RF reader for receiving coded data from at least one RF tag positioned at a known location;
    at least one optical device for capturing an image of a visual cue positioned at a known location;
    said visual cue being positioned to fall within a field of view of said at least one optical device when said at least one RF tag is within range to be read by said RF reader;
    means for decoding said coded data;
    means for processing said captured image to determine the position of said visual cue; and
    means for combining said decoded data and said detected visual cue to calculate a position of said moveable platform.

2. The apparatus of claim 1 wherein said RF reader and said optical device are affixed to a moveable platform.

3. The apparatus of claim 2 wherein said moveable platform is an elevator.

4. The apparatus of claim 1 wherein said image is a one dimensional image.

5. The apparatus of claim 1 wherein said image is a two dimensional image.

6. The apparatus of claim 1 additionally comprising a memory device in which is stored position information of each of said at least one RF tag and each of said at least one visual markers.

7. The apparatus of claim 1 additionally comprising an illumination source.

8. The apparatus of claim 7 wherein said illumination source comprises an infrared light source and said optical device is an infrared camera.

9. The apparatus of claim 7 wherein said illumination source comprises an ultraviolet light source and said optical device is an ultraviolet camera.

10. The apparatus of claim 1 wherein said visual cue is a horizontal line.

11. The apparatus of claim 1 wherein said means for processing said captured image comprises means for performing sub-pixel image processing.

12. A method for determining position comprising the steps of:
    providing a plurality of RF tags at fixed positions;
    providing a plurality of visual markers at fixed positions;
    affixing an RF reader to a moveable platform;
    affixing an optical device to said moveable platform;
    using said RF reader to receive coded information from one of said plurality of RF tags;
    imaging at least one of said plurality of visual markers with said optical device to produce an image;
    performing image processing on said image to identify a position of a visual cue in said image; and
    combining said position of said visual cue with said coded information to determine a location of said moveable platform wherein said visual cue is positioned to fall within a field of view of said at least one optical device when said at least one RF tag is within range to be read by said RF reader.

13. The method of claim 12 wherein said moveable platform is an elevator.

14. The method of claim 12 wherein said performing said image processing comprises performing sub-pixel image processing.

15. The method of claim 12 wherein imaging said at least one of said plurality of visual markers comprises capturing a one dimensional image.

16. The method of claim 12 wherein imaging said at least one of said plurality of visual markers comprises capturing a two dimensional image.

17. The method of claim 12 comprising the steps of:
    storing in a memory device said fixed positions of said plurality of visual markers;
    retrieving at least one of said fixed positions of said plurality of visual markers using said received coded information; and
    comparing said retrieved at least one of said fixed positions to said position of said visual cue to determine said location of said moveable platform.

18. The method of claim 12, further comprising:
    calculating a defined feature of the visual cue; and
    comparing the calculated defined feature with a center of the image so as to determine a relative position of the moveable platform at a floor level.

* * * * *

UNITED STATES PATENT AND TRADEMARK OFFICE
CERTIFICATE OF CORRECTION

PATENT NO. : 7,600,613 B2  Page 1 of 1
APPLICATION NO. : 10/576836
DATED : October 13, 2009
INVENTOR(S) : Kang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 705 days.

Signed and Sealed this

Fifth Day of October, 2010

David J. Kappos
*Director of the United States Patent and Trademark Office*